May 18, 1965
G. P. TROMBLEY
3,183,986
MOTORIZED SNOW SLED
Filed June 19, 1962
3 Sheets-Sheet 1
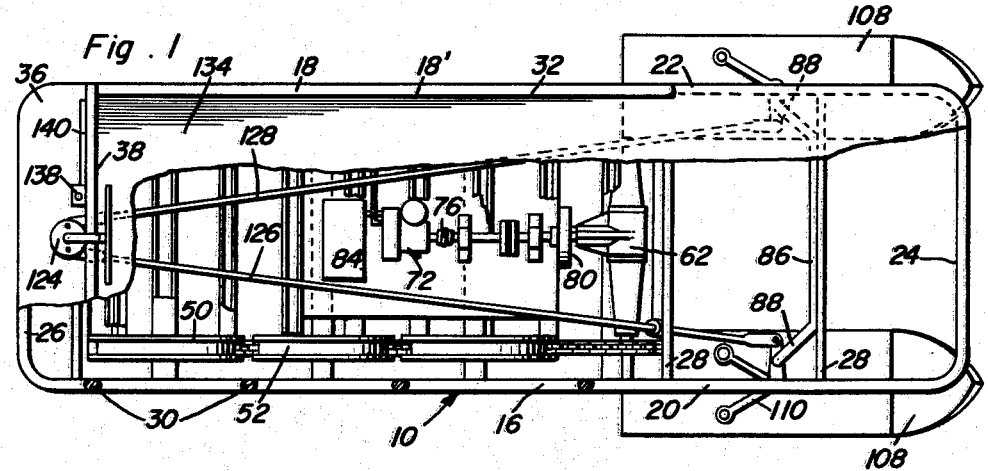
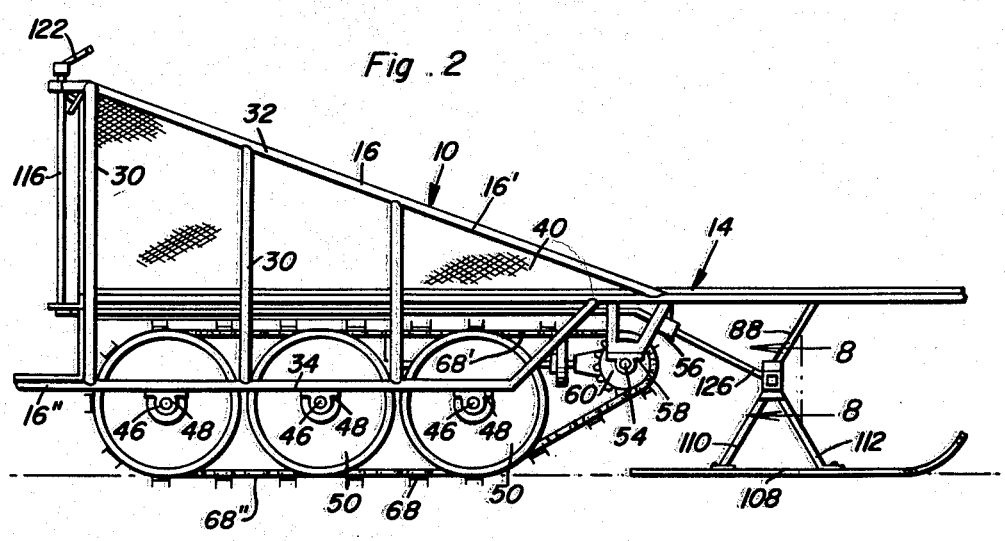
Gerald P. Trombley
INVENTOR.
BY
Attorneys May 18, 1965

G. P. TROMBLEY 3,183,986

MOTORIZED SNOW SLED

Filed June 19, 1962

Gerald P. Trombley
INVENTOR.

BY *(signatures)*
Attorneys

May 18, 1965
G. P. TROMBLEY
3,183,986
MOTORIZED SNOW SLED
Filed June 19, 1962
3 Sheets-Sheet 3
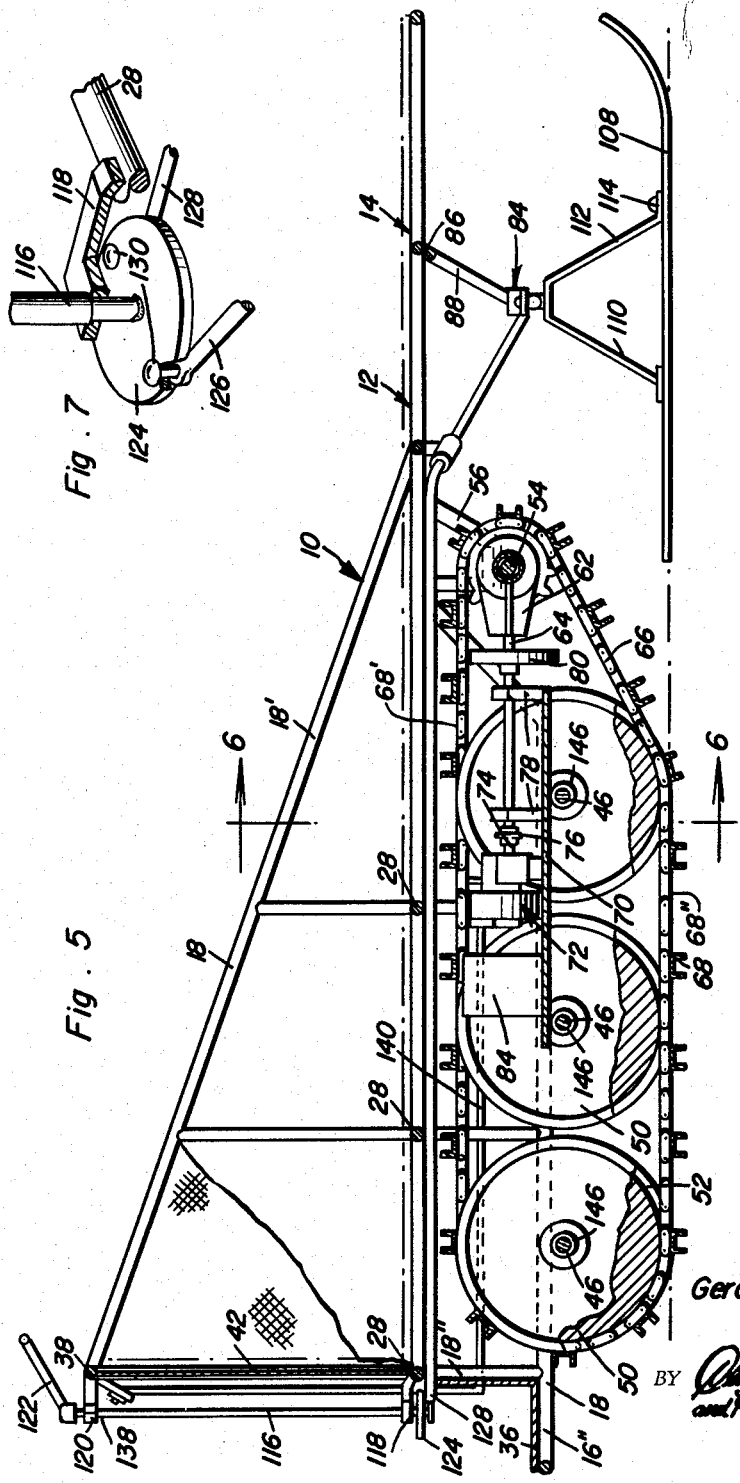
Gerald P. Trombley
INVENTOR.

United States Patent Office 3,183,986
Patented May 18, 1965

3,183,986
MOTORIZED SNOW SLED
Gerald P. Trombley, New Hyde Park, N.Y.
(9 N. Maryland Ave., Port Washington, N.Y.)
Filed June 19, 1962, Ser. No. 203,511
2 Claims. (Cl. 180—5)

This invention relates to a novel and useful snow sled and more specifically to a motorized vehicle constructed so as to be primarily designed for travelling over snow and ice.

The snow sled of the instant invention includes a generally horizontally disposed support frame having elongated longitudinally extending parallel depending side sections which extend along and are supported from the opposite side marginal edge portions of an upper section of the frame. The snow sled of the instant invention includes a crawler tread type drive assembly and while most vehicles are provided with crawler tread type drive assemblies having a pair of crawler treads mounted on opposite sides of the vehicle whereby one crawler tread may be driven and the other may be braked in order to turn the vehicle, the snow sled of the instant invention includes a single crawler tread type drive assembly and relies upon a forward skid type or ski type assembly which is mounted from the main frame of the sled for rotation about an upstanding axis whereby the sled may be steered.

The single crawler tread type drive assembly of the instant invention extends substantially the entire width across the sled and thereby affords maximum traction and distributes the weight of the sled over a greater area. In this manner, the snow sled of the instant invention is particularly well adapted to travel over fine snow without sinking into the latter to a great extent and over crusted snow without penetrating the crust.

The main object of this invention is to provide a motorized snow sled which may be constructed in a manner so as to provide the desired mode of travel over snow and ice at a minimum of cost.

A further object of this invention, in accordance with the immediately preceding object is to provide a snow sled which will be easy to operate and which will include a minimum amount of controls for operating the sled.

A still further object of this invention is to provide a motorized snow sled which may be constructed of lightweight components thereby still further reducing the possibility of the snow sled sinking into dry powdery snow and breaking through crusted snow.

Yet another object of this invention is to provide a motorized snow sled in accordance with the preceding objects which will be constructed of a minimum number of component parts so as to lessen the possibility of parts failure.

Another object of this invention is to provide a motorized snow sled whose crawler tread type drive assembly is driven by means of a prime mover which is connected thereto in such a manner whereby the prime mover will also act as a brake for the snow sled.

Yet another object of this invention, in accordance with the immediately preceding object, is to drivingly connect the prime mover of the snow sled to the crawler tread type drive assembly thereof by means of worm gearing and to mount a heavy fly wheel on the worm gear so that the inertia of the flywheel will have a tendency to prolong the rotation of the worm gear and thus bring the sled to a smoother and slower stop.

A final object of this invention to be specifically enumerated herein is to provide a motorized snow sled in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

FIGURE 1 is a top plan view of the snow sled of the instant invention shown with parts thereof being broken away and shown in section;

FIGURE 2 is a side elevational view of the embodiment illustrated in FIGURE 1;

FIGURE 5 is an enlarged longitudinal vertical sectional view of the snow sled taken substantially upon the plane indicated by section line 5—5 of FIGURE 4;

FIGURE 7 is a fragmentary enlarged perspective view of the steering control for the sled shown with part thereof being broken away and shown in section.

Figure 3:
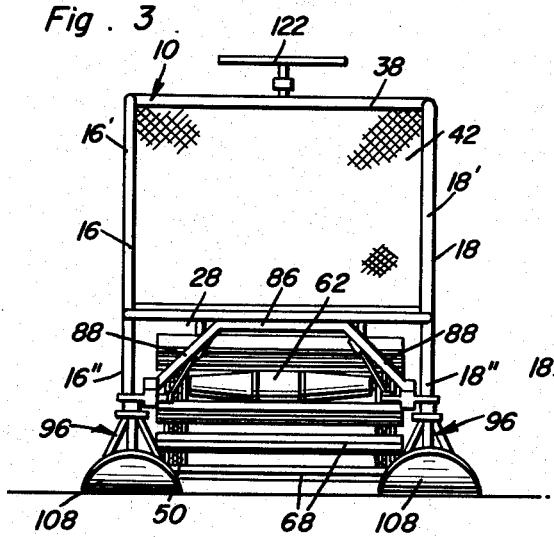
FIGURE 3 is a front elevational view of the snow sled.
Figure 4:
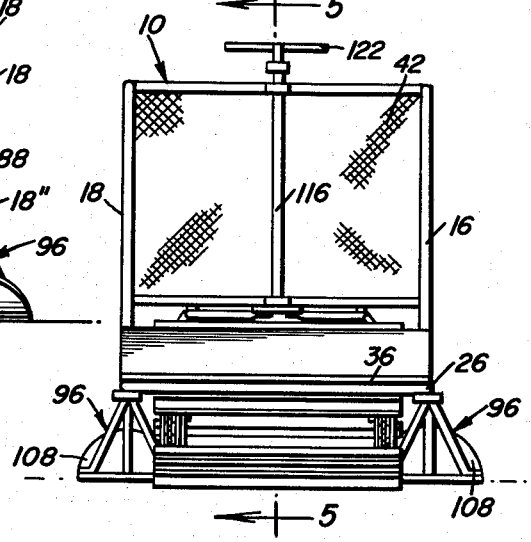
FIGURE 4 is a rear elevational view of the snow sled.

Referring now more specifically to the drawings, the numeral 10 generally designates the snow sled of the instant invention which includes a generally horizontally disposed support frame referred to in general by the reference numeral 12. The support frame 12 includes a horizontally disposed elongated upper section generally referred to by the reference numeral 14 and a pair of elongated upstanding longitudinally extending side sections 16 and 18. Each of the side sections 16 and 18 projects below the upper section 14 along opposite sides thereof and the upper ends of each of the side sections 16 and 18 project above the horizontal section 14. The portions of the side sections 16 and 18 projecting above the horizontal section 14 comprises sides 16′ and 18′ and the portions of the side sections 16 and 18 projecting below the horizontal section 14 comprise depending support assembly assembly legs 16″ and 18″.

It may be seen from FIGURE 1 of the drawings that the horizontal section 16 of the support frame 12 is generally rectangular in plan including opposite side members 20 and 22 which are interconnected at corresponding ends by means of transverse end members 24 and 26. In addition, the horizontal section 14 includes a plurality of transverse brace members 28 which are interconnected between corresponding portions of the side members 20 and 22.

Each of the side sections 16 and 18 includes a plurality of uprights 30, a rearwardly and upwardly inclined top brace 32 which interconnects the upper ends of the corresponding uprights 30, and a lower longitudinally extending brace 34 which interconnects the lower ends of the uprights 30 on the corresponding side of the support frame 12.

A rear step 36 is secured across the rear of the support frame 12 between the rear ends of the lower braces 34. From FIGURE 3 of the drawings it may be seen that the rear ends of the top braces 32 are interconnected by means of a rear top brace 38. Additionally, side panels 40 and a rear panel 42 of wire mesh may be utilized to define cargo space with panels 40, 42 secured over the portions of the side sections 16 and 18 projecting above the horizontal section 14 and across the rear of the side sections 16 and 18.

With attention now directed to FIGURES 2 and 5 of the drawings it may be seen that a plurality of support shafts 46 are supported for rotation about a longitudinal axis by means of journal blocks 48 carried by and spaced longitudinally along the lower braces 34. The support shafts 46 each have a pair of idler wheels 50 mounted on their opposite ends and each idler wheel 50 is provided with a circumferential groove 52.

A drive shaft 54 is journaled for rotation from the horizontal section 14 of the frame 12 by means of depending supports 56 and journal blocks 58 and the drive shaft 54 has a pair of sprocket wheels 60 mounted on its opposite ends. The drive shaft 54 is journaled in and passes through a worm gear transmission 62 and it is to be understood that the input shaft 64 for the transmission 62 has a worm gear mounted thereon which is meshed with a gear carried by the drive shaft 54. While the drive shaft 54 is of one-piece and extends completely through the transmission 62, it of course may be made in two sections and still have its end sections both driven from the input shaft 64.

A pair of endless flexible chains 66 are entrained over the corresponding sprockets and idler wheels 50 and have transversely extending lugs or pads 68 secured therebetween wherein a crawler tread-type drive assembly is provided including an endless crawler tread assembly extending substantially the entire width of the sled 10 intermediate the side sections 16 and 18 and including upper and lower reaches 68' and 68.

A support platform 70 is supported from the center portions of the two forward support shafts 46 and has an internal combustion engine generally referred to by the reference numeral 72 mounted thereon. The internal combustion engine 72 is of the two-stroke cycle type and is desired to operate at high speeds. The internal combustion engine 72 includes an output shaft 74 and the output shaft is drivingly connected to the input shaft 64 by means of a clutch assembly 76 which may be either automatic in operation or of the positively actuated type. A pair of journal blocks 78 journal the input shaft 64 and the latter has a heavy flywheel 80 mounted thereon.

It will be noted that a gas tank 84 is also supported from the platform 70 for carrying a supply of fuel for the internal combustion engine 72.

A front skid assembly generally referred to by the reference numeral 84 is carried by the forward portion of the horizontal section 14 of the frame 12 and includes a transverse support 86 including downwardly and outwardly inclined opposite end portions 88 on which steering arms 90 are pivotally mounted by means of spindle portions 92 having retaining nuts 94 threadedly engaged therewith. Each of the steering arms 90 has a depending skid assembly generally referred to by the reference numeral 96 fixedly secured thereto. The steering arms 90 are each provided with a non-circular opening 98 in which a complementary non-circular shank carried by the corresponding shank 100 is secured by means of a threaded fastener 102. The lower end of each shank 100 has a generally inverted V-shaped leg assembly 104 fixedly secured thereto in any convenient manner such as by welding 106 and a ski member 108 is secured to the lower ends of the legs 110 and 112 of each leg assembly 104 by means of fasteners 114.

An upstanding steering shaft 116 is journalled for rotation from the rear of the frame 12 by means of a journal plate 118 carried by the rearmost transverse brace member 28 and a journal plate 120 carried by the rear top brace 38. A handle bar assembly 122 is fixed to the upper end of the steering shaft and a disk 124 is secured to the lower end of the steering shaft 116. A pair of steering arms 126 and 128 have corresponding ends pivotally secured to diametrically opposite portions of the disk 124 by means of pivot pins 130 and the other pair of corresponding ends of the steerings arms 126 and 128 are pivotally secured to the corresponding steering arm 90 by means of a pivot pin 132.

A flooring 134 is secured between the side sections 16 and 18 and to the transverse brace members 28 in any convenient manner such as by welding 136. In addition, a movable actuator 138 is operatively connected to the throttle controls of the internal combustion engine 72 by means of a flexible control cable 140 which extends downwardly from the rear top brace 38 and over to the left side of the frame 12 and from the rear left hand corner of the frame 12 forwardly to the mid-point of the crawler tread drive assembly at which point it is laterally directed inwardly between the upper and lower reaches of the crawler tread assembly and operatively connected to the throttle of the internal combustion engine 72.

In operation, if the clutch 76 is of the automatic type, as soon as the internal combustion engine 72 has been started and its speed has been increased above its idle speed, the clutch 76 will engage the output shaft 74 with the input shaft 64 and effect operation of the crawler tread assembly. Then, the handle bar assembly 122 may be utilized to steer the skid assemblies 84. If it is desired to stop the sled 10, the throttle controls for the internal combustion engine 72 may be closed whereupon the worm gearing in the transmission 62 will quickly bring the sled 10 to a stop immediately before which the automatic clutch 76 will disengage the output shaft 74 from the input shaft 64. However, the heavy flywheel 80 mounted on the input shaft 64 will have considerable inertia during operation of the sled 10 and as soon as the throttle controls for the internal combustion engine 72 are closed, the inertia of the flywheel 80 will tend to continue to rotate the input shaft 64 which will bring the sled 10 to a more gradual stop.

Figure 6:
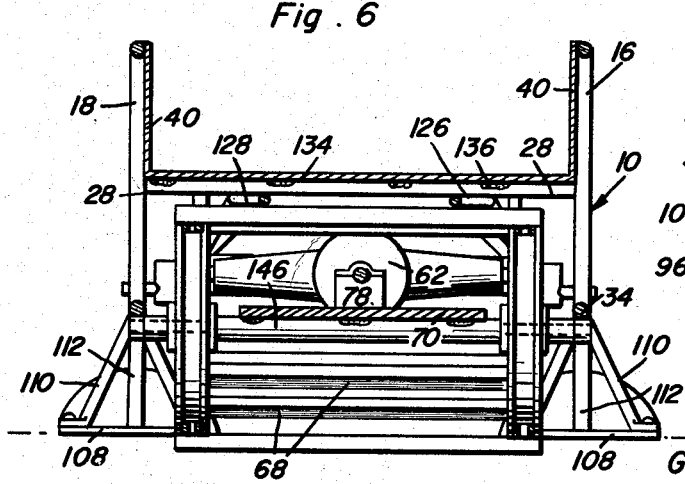
FIGURE 6 is a vertical transverse sectional view taken substantially upon the plane indicated by section line 6—6 of FIGURE 5.
Figure 8:
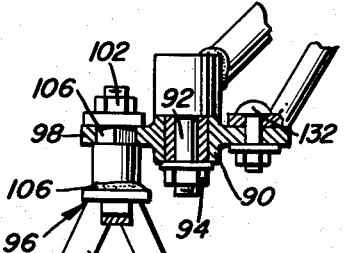
FIGURE 8 is an enlarged fragmentary vertical transverse sectional view taken substantially upon the plane indicated by section line 8—8 of FIGURE 2.

As can best be seen from FIGURES 5 and 6 of the drawings, the support platform 70 is mounted upon sleeve members 146 which rotatably receive the portions of the front two support shafts 46 disposed between the corresponding idler wheels 50.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A motorized snow sled comprising a support frame including a generally horizontally disposed elongated longitudinally extending upper section, a pair of generally parallel depending side sections extending along and supported from the opposite side marginal edge portions of said upper section, a crawler tread-type drive assembly supported from and between said side sections and below said upper section including a single elongated endless crawler tread assembly including upper and lower reaches with the lower reach including at least portions disposed below the lowermost portions of said side sections, and motor means supported from said support frame, drivingly connected to said tread assembly and disposed within the confines of said endless crawler tread assembly, said crawler tread-type drive assembly including a drive shaft journalled between said side sections having a drive wheel fixed on each end, said crawler tread assembly including a pair of elongated, endless and flexible tension members entrained about said drive wheels, said tread assembly including a plurality of elongated transversely extending cleats interconnecting said tension members at points spaced longitudinally therealong, said motor means including an output shaft to which a worm gear is operatively connected, said drive shaft having a gear wheel mounted thereon with which said worm gear is meshed, said output shaft including clutch means disposed between said motor and worm gear and a heavy flywheel disposed between said gear wheel and clutch means.

2. The combination of claim 1 including a front skid assembly disposed forwardly of the point of contact of said tread assembly with the surface on which said snow sled is resting, means mounting said front skid assembly in depending relation from said upper section of said frame and for rotation about an upstanding axis relative to said frame, said front skid assembly comprising a pair of steering arms rotatably supported from and below said upper section for rotation about upstanding axes spaced transversely of said upper section, a depending skid assembly carried by each of said arms, a rear steering control including an upright steering shaft journaled from the rear of said upper section for rotation about an upstanding axis and provided with handle means at its upper end, radially projecting arm means carried by the lower end of said steering shaft, and a pair of elongated rod-like members pivotally secured at opposite ends between said arm means and said steering arms for oscillating said skid in response to oscillation of said shaft.

References Cited by the Examiner

UNITED STATES PATENTS

| | | | |
|---|---|---|---|
| 817,071 | 4/06 | King et al. | 180—5 |
| 1,154,321 | 9/15 | Kinnel | 180—5 |
| 1,202,935 | 10/16 | Wheat | 180—6.7 X |
| 1,696,125 | 12/28 | Rantasa | 180—5 |
| 2,617,659 | 11/52 | Grenier | 180—5 X |
| 2,855,059 | 10/58 | Sutherland | 180—5 X |
| 3,011,576 | 12/61 | Howes | 180—5 |

FOREIGN PATENTS 1,076,490  4/54  France.

A. HARRY LEVY, *Primary Examiner.*

LEO FRIAGLIA, *Examiner.*